United States Patent

Schulz-Hausmann et al.

[11] Patent Number: 5,829,794
[45] Date of Patent: Nov. 3, 1998

[54] VACUUMTIGHT CONNECTION

[75] Inventors: Friedrich Schulz-Hausmann, Bonn; Wilhelm Walter, Kerpen; Hans-Rudolf Fischer, Erftstadt; Heinrich Englander, Linnich, all of Germany

[73] Assignee: Leybold Aktiengesellschaft, Germany

[21] Appl. No.: 737,108

[22] PCT Filed: Jan. 19, 1995

[86] PCT No.: PCT/EP95/00188

§ 371 Date: Oct. 18, 1996

§ 102(e) Date: Oct. 18, 1996

[87] PCT Pub. No.: WO95/28596

PCT Pub. Date: Oct. 26, 1995

[51] Int. Cl.⁶ .................................. F16I 23/00
[52] U.S. Cl. .................. 285/205; 285/212; 285/368; 285/194; 285/420
[58] Field of Search .................. 285/205, 206, 285/124.1, 124.2, 124.3, 211, 212, 192, 194, 368, 118, 325, 420

[56] References Cited

U.S. PATENT DOCUMENTS

| | | | |
|---|---|---|---|
| 1,231,928 | 7/1917 | Miller et al. | 285/124.2 |
| 2,367,700 | 1/1945 | Thompson et al. | 285/194 |
| 3,142,358 | 7/1964 | Woerheide, Jr. | 285/212 |
| 3,542,381 | 11/1970 | Hait . | |
| 3,869,152 | 3/1975 | DeVincent et al. | 285/124.3 |
| 4,023,836 | 5/1977 | Applehans | 285/368 |
| 4,426,103 | 1/1984 | Sundholm | 285/368 |
| 4,468,054 | 8/1984 | Orth | 285/124.3 |
| 5,383,690 | 1/1995 | Niemeier et al. | 285/194 |
| 5,387,014 | 2/1995 | Chevallier | 285/206 |
| 5,593,279 | 1/1997 | Hayashi | 285/205 |

FOREIGN PATENT DOCUMENTS

| | | | |
|---|---|---|---|
| 397136 | 6/1993 | Austria . | |
| 0521776 | 1/1993 | European Pat. Off. . | |
| 2668242 | 4/1992 | France . | |
| 2450996 | 5/1976 | Germany | 285/118 |
| 3810385 | 5/1992 | Germany . | |
| 262756 | 5/1964 | Netherlands | 285/325 |
| 974018 | 11/1982 | Russian Federation . | |
| 330301 | 6/1930 | United Kingdom | 285/118 |
| 773159 | 4/1957 | United Kingdom . | |
| 2108617 | 5/1983 | United Kingdom . | |

*Primary Examiner*—Eric K. Nicholson
*Attorney, Agent, or Firm*—Wall Marjama Bilinski & Burr

[57] ABSTRACT

The invention relates to a vacuumtight connection between an (inner) channel (3) opening into the surface of the housing (2) of an appliance, pump or the like, the opening (4) of which is fitted with a sealing surface (5), and an (outer) line (6) having a flange (7) with a sealing surface (8) at the end to be connected to the channel (4); in order to make the connection compact and user-friendly, it is proposed that sealing surface (5) on the housing side and surrounding the opening (4) of the channel (3) be in the region of the housing surface and that, for the vacuumtight connection joint between the flange (7) of the outer line (6) and the housing surface, a securing plate (10) be used which lies on the edge of the flange (7) away from the housing (2) once the connection has been made. (drawing FIG. 4)

6 Claims, 3 Drawing Sheets

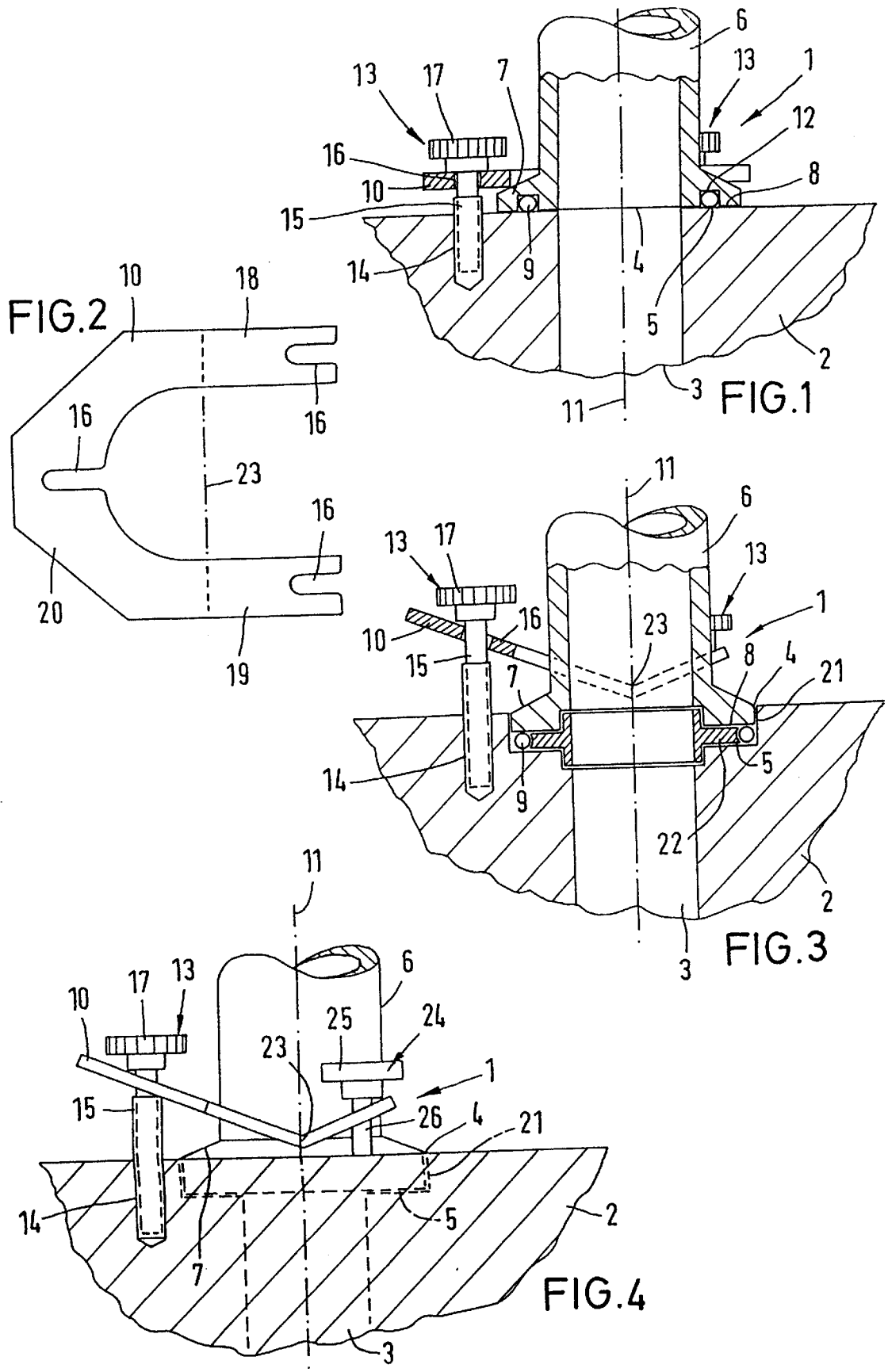

VACUUMTIGHT CONNECTION

BACKGROUND OF THE INVENTION

The invention relates to a vacuumtight connection between a channel opening into the surface of the housing of an appliance, pump or the like, and a line having a flange with a sealing surface at the end to be connected to the channel.

It is known to employ flange components for providing a vacuumtight connection between appliances, pumps or alike and feed or discharge lines. At the point where the channel opens out into the surface of the housing there is commonly provided a connecting sleeve with a flange. Also the line which is to be connected to the connecting sleeve is equipped with a flange. The connection itself is made by fitting the flanges together and securing them in place by means of a clamping ring or other flange connecting components. Generally, sealing rings made of plastic, rubber or also metal are provided for vacuumtight connections of this kind. These sealing rings are located between the sealing surfaces in each case. Their nominal position is maintained with the aid of grooves, centering rings or similar.

Connection sleeves protruding from the housing of a pump, an appliance or alike, increase their volume. The risk of damaging the sealing surfaces at the protruding flanges is high. Finally, the space requirement necessary for providing the flange connection is high, since the use of both hands is required for attaching and fixing a clamping ring or other flange connecting components.

SUMMARY OF THE INVENTION

It is the task of the present invention to make the connection geometry of a vacuumtight connection between the housing of an appliance, a pump or similar and a line, more compact and user-friendly.

This task is solved by the present invention in that the sealing surface surrounding the opening of the channel on the housing side is located in the region of the surface of the housing, and where for the vacuumtight connection joint between the flange of the outer line and the housing surface, a securing plate is used which lies on the edge of the flange away from the housing once the connection has been made. In a connection designed in this manner, a protruding connection sleeve is no longer present. The occupied total volume is smaller and the risk of damaging sealing surfaces on protruding flanges is diminished.

Preferably the flange sealing surface on the side of the housing is located in a recess in the surface of the housing. This practically excludes the risk of damaging the sealing surface.

BRIEF DESCRIPTION OF THE DRAWINGS

Further advantages and details of the present invention shall be explained by referring to the design examples presented in drawing FIGS. 1 to 8.

Shown in drawing FIG. 1 is a connection in accordance with the present invention having a sealing surface at the plane of the surface of the housing, shown in drawing FIG. 2 is a top view on to a securing plate, shown in drawing FIGS. 3 and 4 are connections in accordance with the present invention having a sealing surface located in a recess in the surface of the housing and shown in drawing

DESCRIPTION OF THE INVENTION

Figure 5:
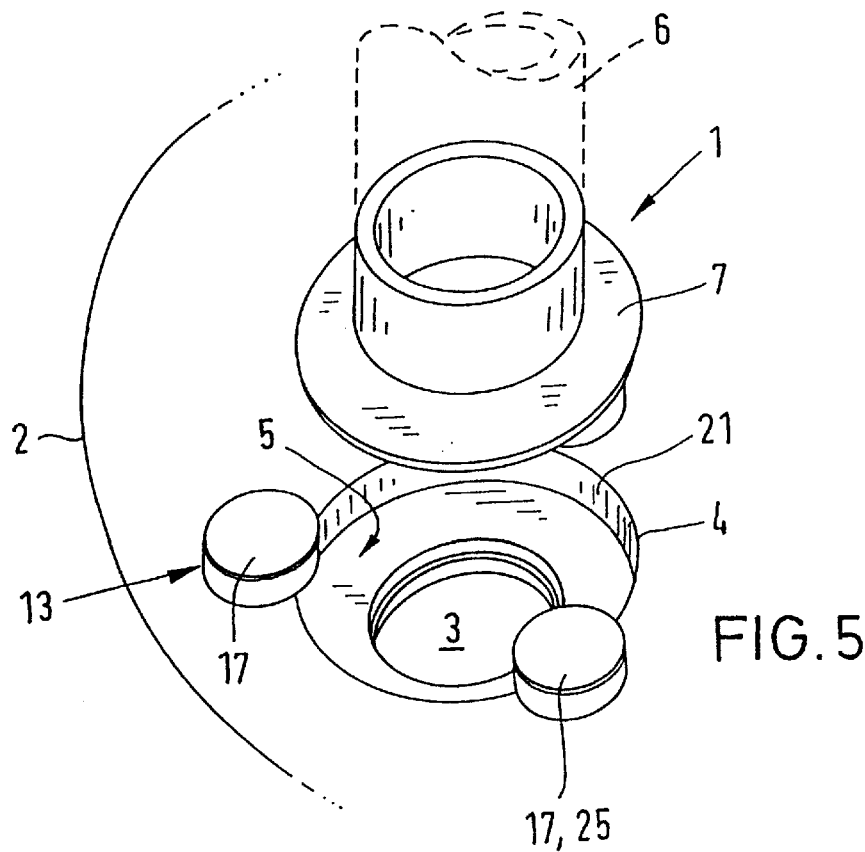
FIGS. 5 to 8 is a design example giving the different positions of the components which are to be connected.
Figure 6:
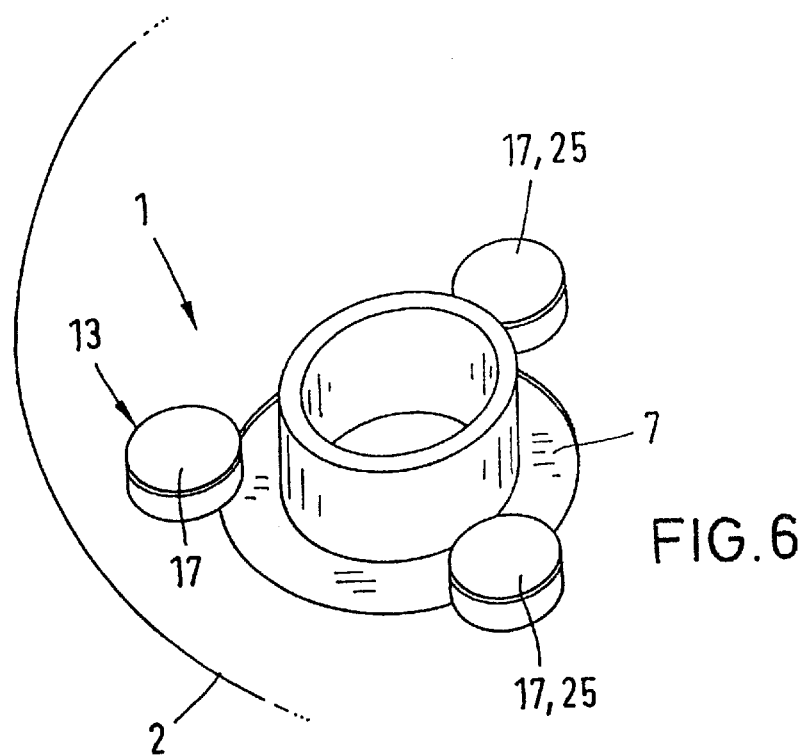
Figure 7:
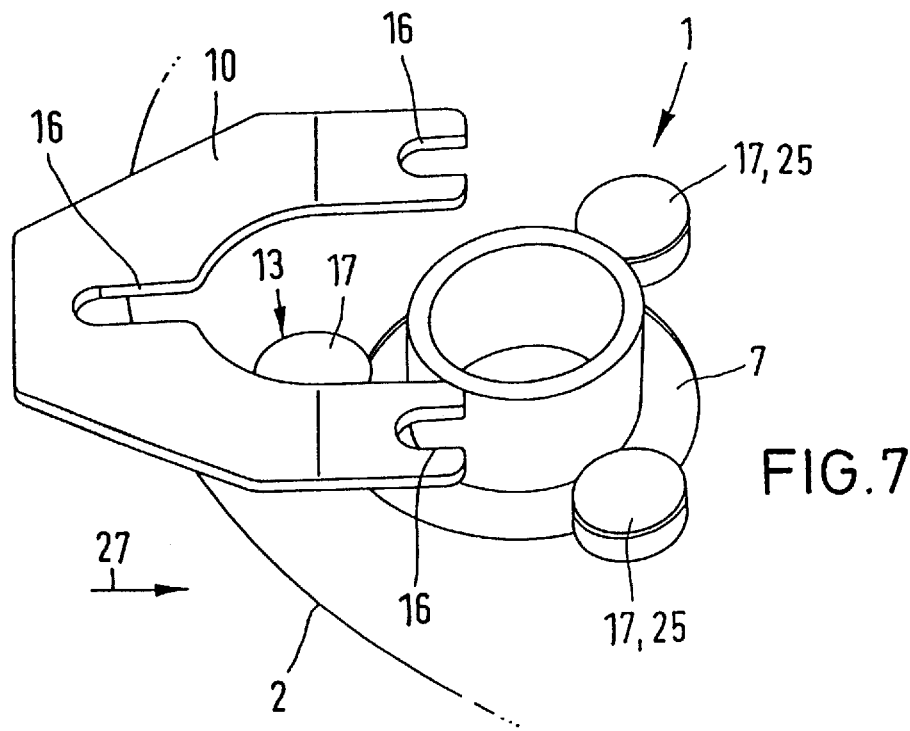
Figure 8:
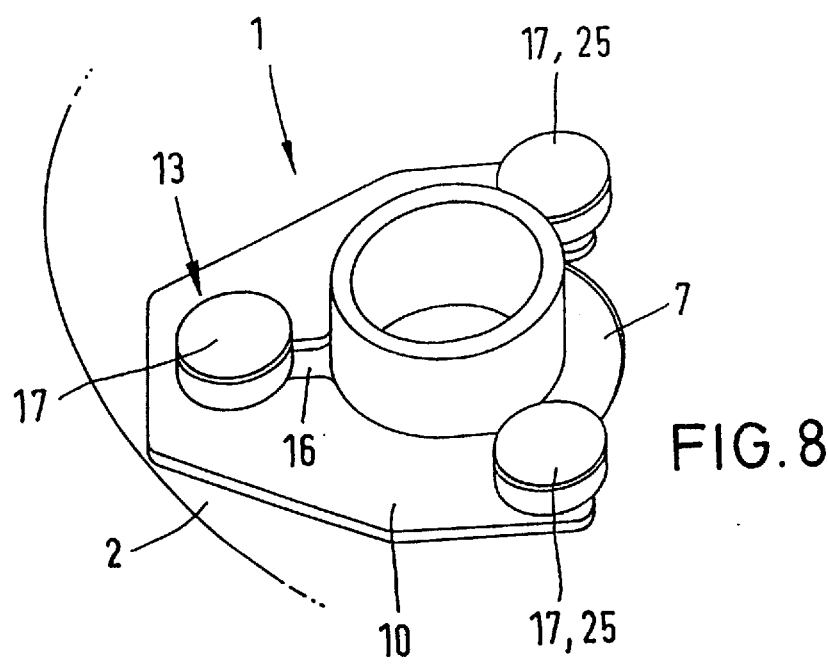

The following designations are used in the drawing figures:

FIG. 1 for the connections in accordance with the present invention,

FIG. 2 for the housing of an appliance, a pump or alike,

FIG. 3 for the inner channel opening into the surface of the housing,

FIG. 4 for the opening of channel 3,

FIG. 5 for the sealing surface surrounding the opening of channel 4 on the side of the housing, FIG. 6 for the outer line which is to be connected to channel 3, FIG. 7 for the flange of this line 6, FIG. 8 for the sealing surface of flange 7, FIG. 9 for the sealing ring located between the sealing surfaces 5 and 8, FIG. 10 for the securing plate holding the flange 7 in its connected position and FIG. 11 for the axis of the connection geometry.

In the design example according to drawing FIG. 1 the sealing surface 5 on the side of the housing extending perpendicular to axis 11 is located on the plane of the surface of the housing 2. In order to secure the sealing ring 9, the flange 7 of line 6 is equipped on its face side with a groove 12. This groove might also be located on the surface of the housing. The flat and U-shaped securing plate 10 rests against the outside on flange 7. It is attached to the housing with the aid of three screws 13. Threaded holes 14 are provided for this purpose in housing 2. The shanks 15 of the screws 13 penetrate the cut-outs 16 in the securing plate 10. The heads 17 of the screws 13 rest on the securing plate 10.

Drawing FIG. 2 indicates that the securing plate 10 is approximately U-shaped thus having two longitudinal sections 18, 19 and a linking section 20. The distance between the longitudinal sections 18, 19 is slightly larger than the outside diameter of the line 6. In this design example the cut-outs 16 are slot-shaped. All slots 16 are orientated in the same direction and extend approximately in parallel to the longitudinal sections 18, 19. Thus it is possible, through the motion of a single detachable part, the securing plate 10, to introduce approximately transversely with respect to axis 11 of the system, all shanks 15 of the screws 13 into the slots 16. When screws 13 are evenly spaced this may be performed from three sides so that accessibility to the connection is improved where space is restricted. To produce a vacuumtight connection it is then required to tighten the screws again which were loosened before to disconnect the connection. This can be performed manually in a relatively quick manner. For this purpose the heads of screws 17 are equipped with a knurl. If higher tensioning forces are required, the heads of screws 17 must be so designed that they will accept wrench.

In the design example according to drawing FIG. 3, the sealing surface 5 on the side of the housing is located in a recess 21 in the housing's surface. In order to secure the sealing ring 9, a basically known centering ring 22 is employed which is in contact with the sealing ring 9 from the inside. A further difference compared to the design example according to drawing FIG. 1 is that the securing plate 10 is bent in the area which comes into contact with the edge of flange 7 so that the sections 18, 19, 20 carrying the cut-outs 16 are inclined in such a manner that at least the longer lever arm effective during the screwing-down process extends away from housing 2. This improves the ratio of the lever arms having a decisive influence on the contact force. The bend is marked—also in drawing FIG. 2—with 23.

From drawing FIG. 4 it can be seen that not all support points for the securing plate 10 need be designed as screws 13. In a design for the securing plate according to drawing FIG. 2 it will be sufficient if only one screw 13 be present. The further support points 24 may be firmly fixed to the housing. Support points 24 of this kind may be brackets, cross grooves or—as indicated—shanks 26 with heads 25, against which the securing panel 10 rests and is secured from the side of the housing when screw 13 is tightened. This permits secure fitting by one hand.

Shown in drawing FIGS. 5 to 8 is a design example in which the various phases of making a vacuumtight connection are indicated. First the flange 7 of line 6 is inserted into recess 4 (drawing FIGS. 5 and 6)—with a sealing/centering ring which is not shown. The securing plate 10 which is equipped with slots orientated in the same direction acting as cut-outs 16 is pushed by a movement to the side (arrow 27 in drawing FIG. 7) under heads 17 or 25 in such a manner that the not visible shanks 15 or 26 enter into slots 16. The vacuumtight connection is made by tightening the screws (drawing FIG. 8). In the case of three screws, tightening of only one screw 13 ensures the generation of the necessary contact force. Thus the two other heads 25 may be part of support points fixed to the housing.

We claim:

1. Apparatus for providing a vacuum tight connection between a pump and an outer line comprising:

a housing having an opening for an internal channel axially passing into the housing, and a first sealing surface surrounding said opening, an outer line having a flange at one end for connecting said line to said housing adjacent the opening of said channel, said flange containing a second sealing surface, and a U-shaped securing plate in contact with said flange of said outer line that is operable to place the first and second sealing surfaces in mating contact to provide a vacuum tight seal between the channel and the outer line, wherein said first sealing surface extends perpendicularly with respect to the axis of said internal channel and in which said U-shaped securing plate includes a number of slotted openings, each sized for accepting fixing screws which can be threaded into said housing, said slotted openings being oriented such that the securing plate can move transversely relative to the axis of the internal channel to permit the screw shanks to be aligned with threaded holes in the housing.

2. The apparatus of claim 1 wherein said first sealing surface is located within a recess formed in said housing.

3. The apparatus of claim 1, wherein said U-shaped securing plate is arranged to accept three screws that are equally spaced about the channel opening, said securing plate being sized for fitting around said outer line so as to allow said outer line to be assembled relative to said housing prior to the installation of said securing plate.

4. The apparatus of claim 1, wherein three support points are spaced evenly about said channel for securing the U-shaped plate, one support point being formed by the head of one screw and two points being fixed to the housing.

5. The apparatus of claim 4, wherein said support points are selected from the group comprising brackets, cross grooves and shanks with heads.

6. The apparatus of claim 1 wherein the securing plate is bent upwardly away from the housing to provide a rest for engaging said flange.

* * * * *

UNITED STATES PATENT AND TRADEMARK OFFICE
CERTIFICATE OF CORRECTION

PATENT NO.   : 5,829,794
DATED        : November 3, 1998
INVENTOR(S)  : Friedrich Schulz-Hausmann, Wilhelm Walter, Hans-Rudolf Fischer and Heinrich Englander It is certified that error appears in the above-identified patent and that said Letters Patent is hereby corrected as shown below:

On the title page: Item [30]

insert

-- Foreign Application Priority Data

[88] April 19, 1994 [DE] Germany  4413488.6 --

Signed and Sealed this

Thirtieth Day of March, 1999

Attest:

Attesting Officer

Q. TODD DICKINSON

Acting Commissioner of Patents and Trademarks